United States Patent [19]
Bomer et al.

[11] 4,181,639
[45] Jan. 1, 1980

[54] POLYMER SOLUTIONS

[75] Inventors: Bruno Bomer, Leverkusen; Hildegard Schnoring, Wuppertal; Rolf Schmidt, Cologne, all of Fed. Rep. of Germany

[73] Assignee: Bayer Aktiengesellschaft, Leverkusen, Fed. Rep. of Germany

[21] Appl. No.: 927,895

[22] Filed: Jul. 25, 1978

[30] Foreign Application Priority Data

Jul. 30, 1977 [JP] Japan ................................. 2734577

[51] Int. Cl.$^2$ ............................................. C08L 33/26
[52] U.S. Cl. ........................... 260/29.6 WB; 252/316; 260/29.6 H
[58] Field of Search ................ 260/29.6 WB, 29.6 H; 526/271, 303; 252/316

[56] References Cited

U.S. PATENT DOCUMENTS

| | | | |
|---|---|---|---|
| 3,635,915 | 1/1972 | Gale | 526/271 |
| 3,790,538 | 2/1974 | Schon | 260/29.6 H |
| 3,876,572 | 4/1975 | Sliwka | 260/29.6 H |
| 3,891,607 | 6/1975 | Kuhn | 260/29.6 H |

*Primary Examiner*—Paul R. Michl
*Attorney, Agent, or Firm*—Connolly and Hutz

[57] ABSTRACT

Aqueous polymer solutions containing water and 5 to 30% by weight of a polymeric mixture of
(A) a copolymer, 65 to 90 mole percent of whose structural units, based on polymer, consist of statistically distributed residues of acrylamide and 10 to 35 mole percent of residues of maleic acid or maleic acid anhydride, and which has an intrinsic viscosity $[\eta]$ of 0.05 to 1 [dl/g], and
(B) a copolymer whose structural units consist of statistically distributed polymerized residues of acrylamide, acrylic acid and maleic acid, at least some of the maleic acid residues being present in salt form, which has an intrinsic viscosity $[\eta]$ of from 0.05 to 1.5 [dl/g] and which contains from 65 to 90 mole percent, based on polymer, of residues of acrylamide and residues of acrylic acid together and from 10 to 35 mole percent of residues of maleic acid, at least some of which are present in salt form, the ratio of weight of copolymer (A) to copolymer (B) being from 1:2 to 20:1.

2 Claims, No Drawings

POLYMER SOLUTIONS

This invention relates to aqueous polymer solutions, to a process for their production and to their use as coacervation component in the production of microcapsules by coacervation.

The aqueous polymer solutions according to the invention contain water and from 5 to 30% by weight, based on the solution, of a polymeric mixture of (A) a copolymer, 65 to 90 mole % of whose structural units, based on polymer, consist of statistically distributed residues of acrylamide and 10 to 35 mole % of residues of maleic acid or maleic acid anhydride and which has an intrinsic viscosity $[\eta]$ of from 0.05 to 1.0 [dl/g], and (B) a copolymer whose structural units consist of statistically distributed polymerised residues of acrylamide, acrylic acid and maleic acid, at least some of the maleic acid residues being present in salt form, which has an intrinsic viscosity $[\eta]$ of from 0.05 to 1.5 [dl/g] and which contains from 65 to 90 mole %, based on polymer, of residues of acrylamide and acrylic acid together and from 10 to 35 mole % of residues of maleic acid, the ratio by weight of (A) to (B) being from 1:2 to 20:1.

The copolymers (A) may be obtained by the radical copolymerization of from 65 to 90 mole % of acrylamide and from 10 to 35 mole % of maleic acid anhydride or maleic acid.

The copolymerisation of acrylamide and maleic acid anhydride is best carried out by precipitation polymerisation in organic solvents which are inert to anhydride groups. Acetone and acetic acid esters of alcohols containing from 1 to 3 carbon atoms are particularly favourable solvents by virtue of their high dissolving power on the monomers and not least by virtue of their ready volatility. The polymerisation reaction may be initiated with the usual radical initiators, such as aliphatic azo compounds, or organic percompounds, such as peroxides or peresters. The polymerisation temperature is determined by the decomposition properties of the initiator and, where azoisobutyrodinitrile is used in batch operation, is in the range from 50° C. to 80° C. In this process, the copolymers are obtained in the form of finely divided powders and may readily be filtered off and freed from residual monomers by washing.

The copolymerisation of acrylamide and maleic acid to form copolymers (A) may be carried out both by precipitation polymerisation in organic solvents and by solution polymerisation in water.

In the precipitation copolymerisation of acrylamide and maleic acid, lower aliphatic alcohols containing from 1 to 4 carbon atoms may also be successfully used in addition to acetone and acetic acid esters of alcohols containing from 1 to 3 carbon atoms. The polymerisation reaction itself and the isolation of the polymer powders are carried out in the same way as for acrylamide/maleic acid anhydride copolymers.

After drying or while they are still moist with solvent, the precipitation copolymers may be dissolved in water to form 5 to 30% by weight solutions, the anhydride groups of the acrylamide/maleic acid anhydride copolymers being converted into maleic acid groups. Where the polymers used are still moist with solvent, the organic solvent is subsequently separated off by decantation and/or distillation.

Another preferred method of producing aqueous solutions of the copolymers (A) is the solution copolymerisation of acrylamide and maleic acid in water. The maleic acid may either be produced by dissolving the corresponding quantity of anhydride in water before polymerisation or may be used as such. Suitable initiators are water-soluble percompounds, such as persulphates or hydrogen peroxide, optionally in combination with a reducing agent and/or a heavy metal salt. Azo compounds with adequate solubility in water are also suitable initiators. Azoisobutyrodinitrile is adequately soluble in water, particularly at elevated temperature, and is particularly preferred because it does not affect the salt content of the solutions.

In the same way as precipitation polymerisation, the solution polymerisation reaction may be carried out in batches with the entire polymerisation mixture being introduced at the beginning of the reaction or may be carried out by a semi-batch process with measured addition of the monomers. In the preferred solution polymerisation process, the aqueous solution of the monomers which contains the initiator in solution or in finely divided suspension, is added in the absence of oxygen to stirred oxygen-free water over a period of about 1 to 10 hours at a temperature of from about 80° to 120° C. The azoisobutyrodinitrile may even be added dropwise at the same time as the monomer solution after dissolution in an organic solvent, the solvent used optionally being continuously distilled off. After the monomer solution has been added, the solution is stirred for 15 to 120 minutes and subsequently cooled to room temperature.

The solutions of the copolymers (A) obtained by solution polymerisation still contain small quantities of residual monomers, although in general these residual monomers do not adversely affect the service properties of the solutions. In addition, copolymers (A) produced in aqueous solution already contain small quantities of acrylic acid and maleic acid salt units formed by hydrolysis during the polymerisation reaction.

Copolymers (A) according to the invention are obtained by the copolymerisation of 65 to 90 mole % of acrylamide and 10 to 35 mole % of maleic acid or maleic acid anhydride. It is preferred to use copolymers (A) of 70 to 85 mole % of acrylamide and 15 to 30 mole % of maleic acid or maleic acid anhydride. The copolymers (A) contain the structural units of acrylamide and maleic acid anhydride in statistical distribution and in quantitative ratios which correspond to the compositions of the monomer mixtures.

The radical initiators are used in quantities of from 0.1 to 10% by weight and preferably in quantities of from 0.3 to 3.0% by weight, based on monomer. In the case of precipitation polymerisation, the polymer yields generally amount of between 75 and 95%. The copolymers (A) have intrinsic viscosities $[\eta]$ of from 0.05 to 1.0 [dl/g] and preferably from 0.08 to 0.4 [dl/g], as measured in a 0.9% aqueous sodium chloride solution.

The solutions of the copolymers (B) may be obtained by heating the aqueous solutions of the copolymers (A) over a relatively long period to temperatures of from 60° C. to 150° C. and preferably to temperatures of from 80° C. to 130° C., optionally under pressure, in an autoclave. Hydrolysis under reflux conditions at normal pressure is particularly preferred. Partial hydrolysis of acrylamide units occurs during heating. The ammonia formed neutralises some of the maleic acid units and, in doing so, increases the pH-value of the solution. As a result of hydrolysis, the acrylamide/maleic acid copolymer is converted into a copolymer which consists of acrylamide, acrylic acid and maleic acid units and in which at least some of the maleic acid units are present in salt form.

In cases where aqueous copolymer solutions (A) produced from thoroughly washed precipitation polymers are hydrolysed, the viscosity of the solution does not undergo any significant change during hydrolysis, in other words the polymer is not degraded, nor are the residual monomers after-polymerised.

When copolymer solutions (A) produced by solution polymerisation in water are heated, the solution viscosity can increase to a more or less considerable extent through after-polymerisation of the residual monomers. However, this increase does not produce any significant change in the coacervation behaviour of the polymers.

Solutions of copolymers (B) according to the invention are obtained by heating solutions of the copolymers (A) according to the invention to temperatures of from 60° to 150° C., preferably to temperatures of from 80° to 130° C. and, with particular preference, to a temperature of around 100° C. (reflux under normal pressure) until the pH-value of the solutions has increased to between 3.8 and 4.9 and preferably to between 4.0 and 4.6. Due to the possible after-polymerisation of residual monomers, the intrinsic viscosities $[\eta]$ of the copolymers (B), as measured in 0.9% aqueous sodium chloride solution, amount to between 0.05 and 1.5 [dl/g] and preferably to between 0.08 and 1.0 [dl/g].

The solutions of the copolymer (A) and the solutions of the copolymers (B) form coacervates with gelatin even on their own, optionally after pH adjustment with ammonia or alkali hydroxide or with acetic acid. However, these coacervates do not form a shell or a closed shell and/or are very tacky.

By mixing the aqueous solutions of the copolymers (A) and (B) according to the invention in a ratio by weight of the dissolved polymers (A):(B) of from 1:2 to 20:1, it is surprisingly possible to obtain polymer solutions which, together with gelatin, give coacervates which form uniform, closed shells and are therefore eminently suitable for the production of microcapsules. The optimal mixing ratio is predominantly influenced by the composition of the copolymer (A) and by the pH-value of the solution of the copolymer (B), which is a measure of the degree of hydrolysis, and has to be experimentally determined for each pair of copolymers. It is of course also possible to mix solutions of copolymer (A) with solutions of copolymer (B) obtained by hydrolysis from copolymers (A') of different composition (for example copolymer (A) with 70 mole percent of acrylamide and 30 mole percent of maleic acid units, and copolymer solution (B) of copolymer (A') with 80 mole percent of acrylamide and 20 mole percent of maleic acid units). In some cases, a change in the pH-value of the polymer solution by adding ammonia or alkali hydroxide or acetic acid can favourably affect the coacervation behaviour.

The process of microencapsulation by complex coacervation is basically known. In this process, the substance to be encapsulated is dispersed in finely divided form in an aqueous solution suitable for coacervate formation, after which coacervation is initiated. This is done by dilution, by changing the pH-value or by cooling or by a combination of these measures, depending upon the system used.

The aqueous polymer solutions according to the invention form complex coacervates with gelatin by dilution and/or cooling. They may be mixed for example in the form of a 10 to 15% by weight aqueous solution with a 10 to 15% by weight gelatin solution and coacervated by dilution and cooling. It is surprising that such highly concentrated solutions can be used. It is also surprising that the coacervates obtained, which of course represent a separate, soft gel phase, contain as much as 20 to 30% by weight of solids. This high solids content makes it very easy to dry the coacervates to form powders. Since the coacervates very easily form coherent shells or coatings, they are eminently suitable for the production of microcapsules. During coacervation, the separate gel phase is formed as a coherent layer on small, liquid or solid separate particles dispersed in the solution and envelopes these particles.

With the combination of polymer solutions according to the invention and gelatin, it is possible to microencapsulate a whole number of water-insoluble or substantially water-insoluble, liquid or solid, dispersible and adequately water-resistant substances, of which the following are mentioned by way of example: organic solvents, paraffin oils, perfume oils, silicone-based antifoaming agents, phosphoric acid esters, liquid crystals and coloured pigments and also pharmaceuticals and plant protection agents.

EXAMPLE 1

(a) Polymerisation: (Copolymer(A))

240 g of acrylamide, 60 g of maleic acid anhydride and 3 g of azoisobutyrodinitrile are dissolved in 2.7 liters of ethyl acetate. The solution is freed from oxygen by repeatedly evacuating the apparatus and filling it with nitrogen, and is then stirred for 20 hours at 60° C. in the absence of oxygen. The polymer precipitated is filtered off, washed thoroughly with ethyl acetate and dried in vacuo at 60° C. 273 g of a finely powdered polymer having an intrinsic viscosity $[\eta]$ of 0.14 [dl/g], as measured in 0.9% aqueous NaCl-solution, are obtained.

(b) Hydrolysis: (Copolymer (B) )

100 g of the dry polymer according to Example 1(a) are dissolved in 900 ml of demineralised water and the resulting solution is heated under reflux at normal pressure until its pH-value is 4.6 (approximately 12 to 18 hours). The solution viscosity is determined by means of a falling-ball viscosimeter immediately after dissolution and after pH-values of 3.0, 3.5, 4.1 and 4.6 have been reached. All the solutions show the same viscosity within the limits of error.

(c) Production of the polymer solution and encapsulation:

150 g of dry polymer according to Example 1(a) are dissolved in 1350 ml of demineralised water. The solution has a pH-value of ~2.2. 150 ml of this solution are mixed with 50 ml of the hydrolysed solution according to Example 1(b). The mixture has a pH value of 3.5. 50 g of a 10% by weight aqueous solution of an acid-limed pigskin gelatin with a pH-value of 5.6 are added at 50° C. to 50 g of the resulting 10% by weight solution of the copolymer mixture. 40 g of heat transfer oil ("Marlotherm$^{(R)}$", a product of Chem. Werke Huls) are added and, by means of a high-speed stirrer, are dispersed at 50° C. into droplets having a diameter of approximately 25μ. Following the addition of 125 g of demineralised water, the dispersion is cooled while stirring to +10° C.

to +5° C. As a result, the oil droplets become coated with a coherent uniformly thick coacervate shell.

EXAMPLES 2–9

Polymer solutions according to Examples 1(a) and 1(b) are mixed in the ratios indicated in the following Table. The mixtures are tested by the method described in Example 1(c). Their encapsulation behaviour is rated as "good" when the oil droplets are surrounded by a coherent, regularly formed and uniformly thick shell, as "average" when the oil droplets are surrounded by a coherent, irregularly formed shell of varying thickness and as "poor" when the shell is neither closed nor coherent, the capsules are very tacky or no shell is formed at all.

Table

| Example No. | Solution according to Example (1b) [g] | Solution according to Example (1a) [g] | pH of mixture | Encapsulation behaviour |
|---|---|---|---|---|
| 2 | 100 | 0 | 4.6 | poor |
| 3 | 150 | 75 | 4.35 | poor |
| 4 | 100 | 100 | 4.1 | average |
| 5 | 75 | 150 | 3.7 | good |
| 6 | 50 | 200 | 3.4 | good |
| 7 | 20 | 180 | 3.0 | good |
| 8 | 10 | 190 | 2.5 | average |
| 9 | 0 | 200 | 2.2 | poor |

EXAMPLES 10–39

330 g of acrylamide and 170 g of maleic acid are dissolved at room temperature in 3500 ml of demineralised water. Following the addition of 4 g of finely powdered azoisobutyrodinitrile, the solution is intensively stirred at 20° to 25° C. and subsequently filtered to remove any undissolved initiator. The solution thus obtained is uniformly added dropwise over a period of 2 hours to 1 liter of boiling oxygen-free water. After stirring under reflux for 1 hour, the polymer solution is cooled. It has a pH-value of 3.0 and an intrinsic viscosity $[\eta]$ of 0.22 [dl/g], as measured in 0.9% aqueous sodium chloride solution.

2 kg of polymer solution are reheated to boiling temperature. When the pH-value has risen to 3.8, 4.0, 4.2, 4.4, 4.6 and 4.9, respectively, 250 ml of solution are removed and mixed with unheated solution.

Table

| Example No. | After-heated solution pH / [g] | starting solution [g] | pH of mixture | Encapsulation behaviour |
|---|---|---|---|---|
| 10 | 3.8 / 50 | — | 3.8 | poor |
| 11 | 3.8 / 50 | 50 | 3.6 | poor |
| 12 | 3.8 / 50 | 100 | 3.4 | average |
| 13 | 3.8 / 25 | 100 | 3.2 | poor |
| 14 | 4.0 / 50 | — | 4.0 | poor |
| 15 | 4.0 / 50 | 50 | 3.8 | average |
| 16 | 4.0 / 50 | 100 | 3.6 | average |
| 17 | 4.0 / 25 | 100 | 3.4 | average |
| 18 | 4.2 / 50 | — | 4.2 | poor |
| 19 | 4.2 / 50 | 25 | 4.1 | average |
| 20 | 4.2 / 50 | 50 | 4.0 | average |
| 21 | 4.2 / 25 | 100 | 3.6 | average |
| 22 | 4.4 / 50 | — | 4.4 | poor |
| 23 | 4.4 / 50 | 25 | 3.6 | average |
| 24 | 4.4 / 50 | 50 | 4.1 | good |
| 25 | 4.4 / 50 | 100 | 3.9 | good |
| 26 | 4.4 / 10 | 90 | 3.4 | good |
| 27 | 4.6 / 50 | — | 4.6 | poor |
| 28 | 4.6 / 50 | 25 | 3.6 | poor |
| 29 | 4.6 / 50 | 50 | 3.6 | average |
| 30 | 4.6 / 25 | 50 | 4.0 | good |
| 31 | 4.6 / 25 | 100 | 3.5 | good |
| 32 | 4.6 / 10 | 90 | 3.4 | good |
| 33 | 4.9 / 50 | 25 | 4.6 | poor |
| 34 | 4.9 / 50 | 50 | 4.3 | average |
| 35 | 4.9 / 25 | 50 | 4.0 | average |
| 36 | 4.9 / 20 | 80 | 3.8 | average |
| 37 | 4.9 / 10 | 90 | 3.3 | almost good |
| 38 | —/ — | 100 | 3.0 | poor |
| 39 | —/ — | 100 ** | 3.6 | poor |

\* pH adjusted by addition of glacial acetic acid
\*\* pH adjusted by addition of ammonia.

EXAMPLES 40–49

300 ml of demineralised water are introduced into a 2 liter capacity multi-necked flask equipped with a stirrer, reflux condenser, dropping funnel and nitrogen inlet pipe. The apparatus is evacuated to ~30 mbars and filled with nitrogen three times. The water is then heated to boiling point while nitrogen is slowly passed over.

150 g of monomers in the ratios by weight or molar ratios indicated in the Table are dissolved in 1550 g of demineralised water. Where maleic acid is used, dissolution takes place at room temperature. Where maleic acid anhydride is used, it is best initially dissolved in water heated to 40°–50° C. for hydrolysis, followed by addition of the acrylamide after cooling to room temperature. 1.0 g of finely powdered azoisobutyrodinitrile is then added, the mixture is stirred for 1 hour at room temperature and filtered to remove any undissolved fractions. The monomer solution thus obtained is uniformly added dropwise over a period of 3 hours to the boiling demineralised water initially introduced into the flask. After stirring for 1 hour at 100° C., the polymer solution is cooled. 1000 g of solution are stored at room temperature and the rest of the solution is boiled until it has the pH-value indicated in the Table. Initially the pH-value is monitored every two hours and then, upwards of pH≈4.0, every hour. The mixed solutions are tested by the method described in Example 1(c). The encapsulation behaviour is evaluated in accordance with Example 2.

| Example No. | Acrylamide % by weight | mole % | Maleic acid anhydride % by weight | mole % | Maleic acid % by weight | mole % | η dl/g | pH-fresh solution | Hydrolysis to pH | Mixture hyrol. Solution/ g | fresh solution g | pH of mixture | Encapsulation behaviour |
|---|---|---|---|---|---|---|---|---|---|---|---|---|---|
| 40 | 55/62.8 | | 45/37.2 | | — | | 0.12 | 2.0 | 3.4 | 50 / 50 | | 2.9 | poor |
| 41 | 60/67.4 | | 40/32.6 | | — | | 0.09 | 2.2 | 3.8 | 50 / 50 | | 3.1 | average |
| 42 | 61/71.9 | | — | | 39/28.1 | | 0.22 | 2.45 | 4.0 | 50 / 50 | | 3.3 | good |
| 43 | 66/76.0 | | — | | 34/24.0 | | 0.16 | 2.7 | 4.3 | 40 / 80 | | 3.3 | good |
| 44 | 75/80.5 | | 25/19.5 | | — | | 0.23 | 3.0 | 4.5 | 30 / 90 | | 3.5 | good |

-continued

| Example No. | Acrylamide % by weight | Acrylamide mole % | Maleic acid anhydride % by weight | Maleic acid anhydride mole % | Maleic acid % by weight | Maleic acid mole % | η dl/g | pH-fresh solution | Hydrolysis to pH | Mixture hyrol. Solution/ g | fresh solution g | pH of mixture | Encapsulation behaviour |
|---|---|---|---|---|---|---|---|---|---|---|---|---|---|
| 45 | 80/84.7 | | 20/15.3 | | — | | 0.24 | 3.2 | 4.5 | 40 / 80 | | 3.8 | good |
| 46 | 77/84.5 | | — | | 23/15.5 | | 0.20 | 3.3 | 4.6 | 30 / 90 | | 3.8 | good |
| 47 | 83/88.9 | | — | | 17/11.1 | | 0.28 | 3.7 | 4.5 | 20 / 120 | | 3.9 | average |
| 48 | 89/93.0 | | — | | 11/7-0 | | 0.39 | 3.7 | 4.5 | 20 / 120 | | 3.9 | poor |
| 49 | 95/96.3 | | 5/3.7 | | — | | 0.60 | 3.9 | 4.9 | 20 / 120 | | 4.0 | poor |

η = intrinsic viscosity, as measured in 0.9 % aqueous sodium chloride solution.

EXAMPLES 50–53

200 ml of boiling oxygen-free water are introduced into a 1 liter capacity multi-necked flask equipped with a stirrer, reflux condenser, dropping funnel and nitrogen inlet pipe. 50 g of acrylamide and 20 g of maleic acid are dissolved in 430 ml of demineralised water. After the quantity of azoisobutyrodinitrile indicated in the Table has been added, the monomer/initiator mixture is uniformly added dropwise over a period of 2.5 hours at 100° C. in the form of a solution (L) or thoroughly stirred suspension (S). After stirring for 1 hour, ~400 ml of solution are removed and stored at room temperature. The rest of the solution is hydrolysed for 12 to 18 hours at 100° C. up to the pH-value indicated. The mixtures are tested by the method described in Examples 1 and 2.

EXAMPLE 56

65 g of acrylamide, 35 g of maleic acid anhydride-dand 1 g of azoisobutyrodinitrile are dissolved in 700 ml of acetone in a 1-liter capacity three-necked flask equipped with a stirrer, reflux condenser and nitrogen inlet pipe. The apparatus is evacuated to 80–100 mbar and filled with nitrogen three times. The contents of the flask are stirred under reflux for 16 hours while nitrogen is slowly passed over. The polymer precipitated is filtered under suction, washed with acetone and dried in vacuo. 82.5 g of polymer powder having an intrinsic viscosity [η] of 0.11 [dl/g], as measured in 0.9% aqueous sodium chloride solution, are obtained.

| Example No. | AIBN g | Fresh solution PH | Fresh solution [η] dl/g | Hydrol. solution pH | Hydrol. solution [η] dl/g | Mixture hydrol. solution/ ml | Mixture fresh solution ml | pH of mixture | Encapsulation |
|---|---|---|---|---|---|---|---|---|---|
| 50 | 0.175 | 2.4 | 0.23 | 4.3 | 1.26 | 100 | 200 | 3.2 | good |
| 51 | 0.350 | 2.7 | 0.21 | 4.5 | 0.81 | 100 | 300 | 3.3 | good |
| 52 | 0.700 | 3.3 | 0.22 | 4.5 | 0.63 | 100 | 200 | 3.6 | good |
| 53 | 1.050 | 3.4 | 0.21 | 4.6 | 0.42 | 100 | 200 | 3.7 | good |

AIBN = azoisobutyrodinitrile
[η] = intrinsic viscosity, as measured in 0.9% aqueous sodium chloride solution.

EXAMPLE 54

200 ml of ethyl acetate are initially introduced into a 1-liter three-necked flask equipped with a stirrer, reflux condenser, dropping funnel and nitrogen inlet pipe. The apparatus and solvent are freed from oxygen by evacuation to approximately 100 mbar and filling with nitrogen three times. At an internal temperature of 60° C., a solution of 50 g of acrylamide, 20 g of maleic acid anhydride and 0.35 g of azoisobutyrodinitrile in 500 ml of ethyl acetate is uniformly added dropwise over a period of 4 hours. After stirring for 16 hours at 60° C., the polymer powder is filtered off, washed with ethyl acetate and dried in vacuo at 50° C. 64.7 g of copolymer powder having an intrinsic viscosity [η] of 0.17 [dl/g], as measured in 0.9% aqueous sodium chloride solution, are obtained.

EXAMPLE 55

200 ml of boiling (oxygen-free) acetone are introduced into the apparatus described in Example 54. A solution of 60 g of acrylamide, 20 g of maleic acid anhydride and 1 g of tert.-butyl perpivalate in 520 ml of acetone is uniformly added dropwise at boiling temperature over a period of three hours. The mixture is then stirred under reflux for 12 hours. 71 g of polymer powder having an intrinsic viscosity [η] of 0.21 [dl/g], as measured in 0.9% aqueous sodium chloride solution, are obtained after filtering, washing with acetone and drying.

EXAMPLE 57

28 g of acrylamide, 22 g of maleic acid and 0.5 g of azoisobutyrodinitrile are dissolved in 500 ml of methanol. The solution is freed from dissolved oxygen in the polymerisation apparatus by evacuation to approximately 100 mbar and filling with nitrogen three times, and is then boiled with stirring for 15 hours in the absence of oxygen. After cooling to room temperature, the copolymer precipitated is filtered off, washed with methanol and dried. 38.1 g of copolymer powder having an intrinsic viscosity [η] of 0.17 [dl/g], as measured in 0.9% aqueous sodium chloride solution, are obtained.

EXAMPLE 58

41.5 g of acrylamide, 8.5 g of maleic acid and 0.5 g of azoisobutyrodinitrile are polymerised under reflux for 15 hours in 500 ml of methanol in the same way as in Example 57. 48.3 g of copolymer powder having an intrinsic viscosity [η] of 0.25 [dl/g], as measured in 0.9% aqueous sodium chloride solution, are obtained.

EXAMPLE 59

28 g of acrylamide, 22 g of maleic acid and 0.5 g of azoisobutyrodinitrile are polymerised under reflux for 6 hours in 500 ml of ethanol in the same way as in Example 57. 40.6 g of copolymer powder having an in trinsic viscosity [η] of 0.09 [dl/g], as measured in 0.9% aqueous sodium chloride solution, are obtained.

We claim:

1. Aqueous polymer solutions containing water and 5 to 30% by weight of a polymeric mixture of
   (A) a copolymer consisting of 65 to 90 mole percent of statistically distributed residues of acrylamide and 10 to 35 mole percent of residues of maleic acid or maleic acid anhydride, and which has an intrinsic viscosity ($\eta$) of 0.05 to 1 (dl/g), and
   (B) a copolymer consisting of 65–90 mole percent of statistically distributed polymerized residues of acrylamide and acrylic acid and 10–35 mole percent of residues of maleic acid, at least some of the maleic acid residues being present in salt from, and said copolymer having an intrinsic viscosity ($\eta$) of from 0.05 to 1.5 (dl/g), and the ratio by weight of copolymer (A) to copolymer (B) is from 1:2 to 20:1.

2. In the process of producing microcapsules by complex coacervation, the improvement which comprises employing an aqueous copolymer solution of claim 1 as the shell-forming component.